Dec. 4, 1951        J. J. PELOUCH        2,577,376
AXLE ENGAGING MEANS FOR VEHICLE HOISTS
Filed Dec. 7, 1948        3 Sheets-Sheet 1
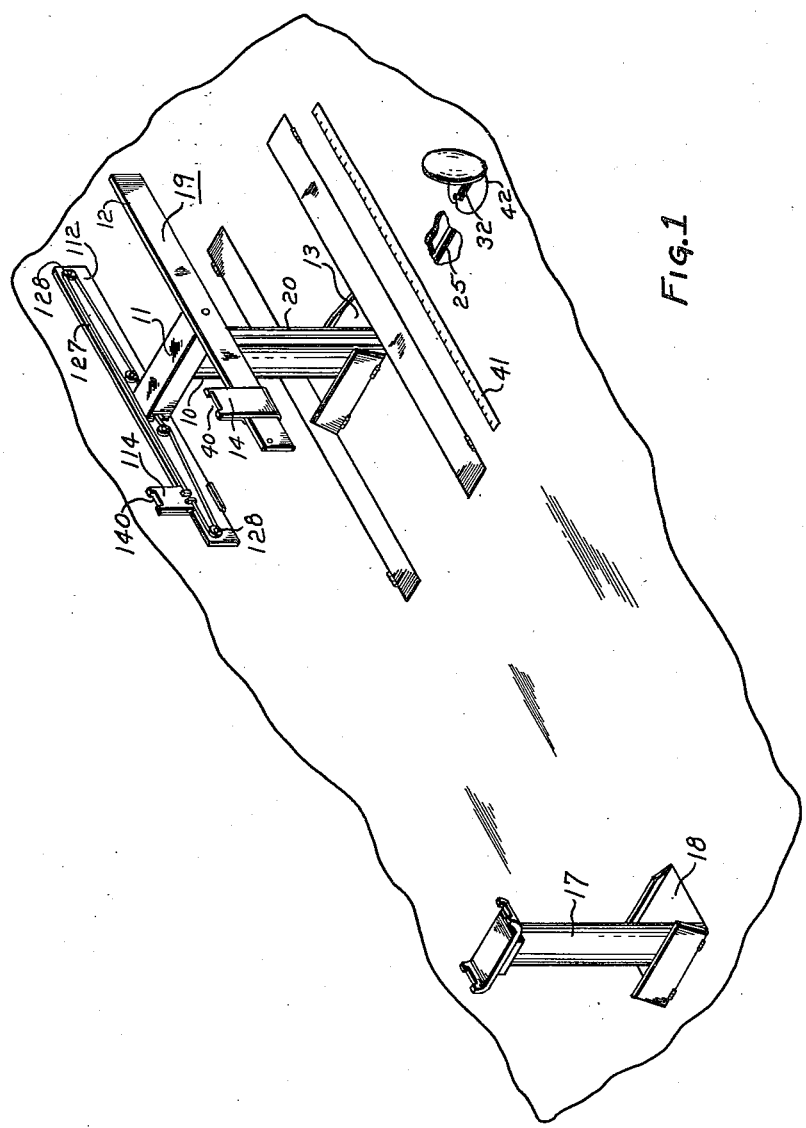
*INVENTOR.*
JAMES J. PELOUCH
BY
Woodling and Krost
ATTORNEYS

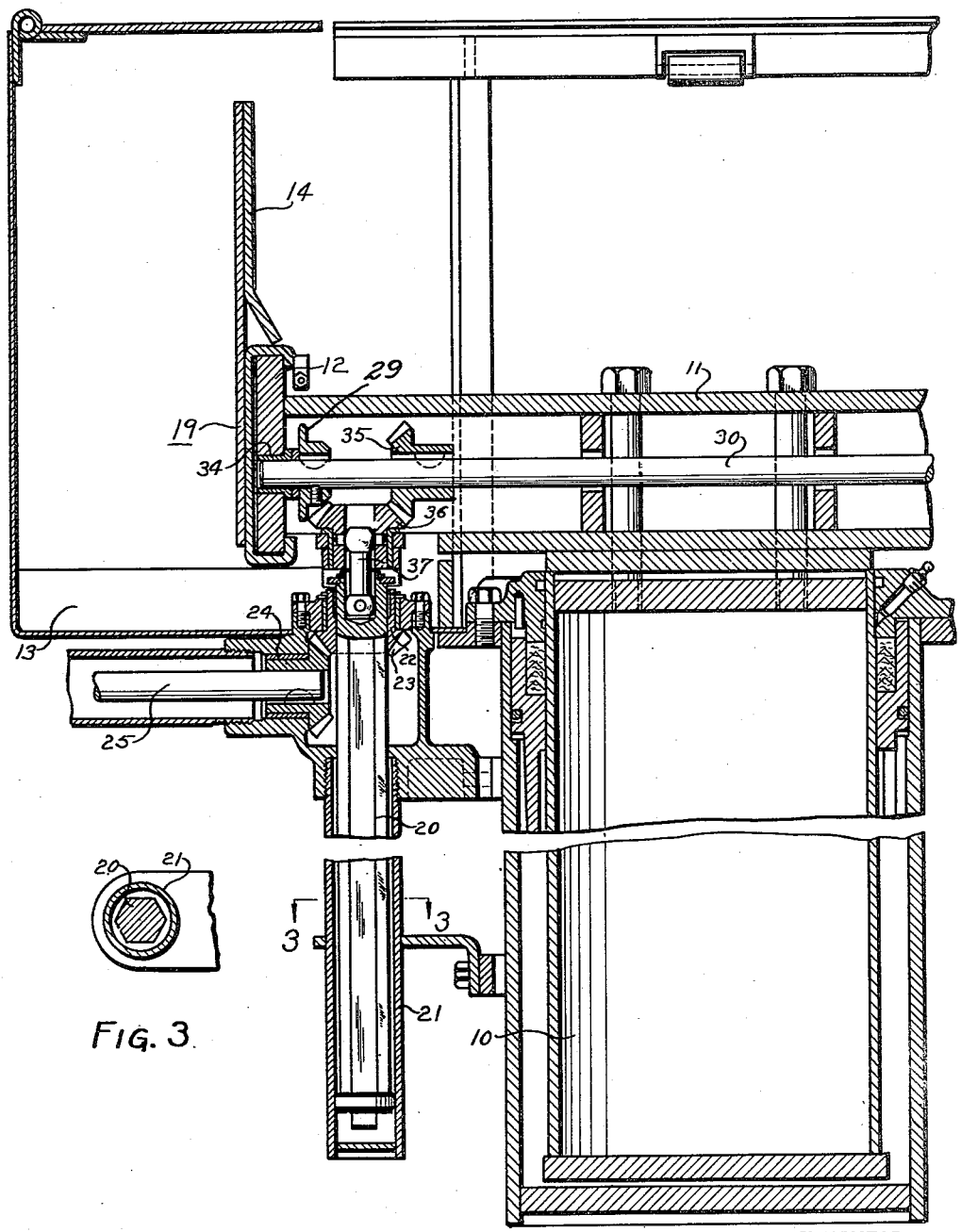

Dec. 4, 1951   J. J. PELOUCH   2,577,376
AXLE ENGAGING MEANS FOR VEHICLE HOISTS
Filed Dec. 7, 1948   3 Sheets-Sheet 3
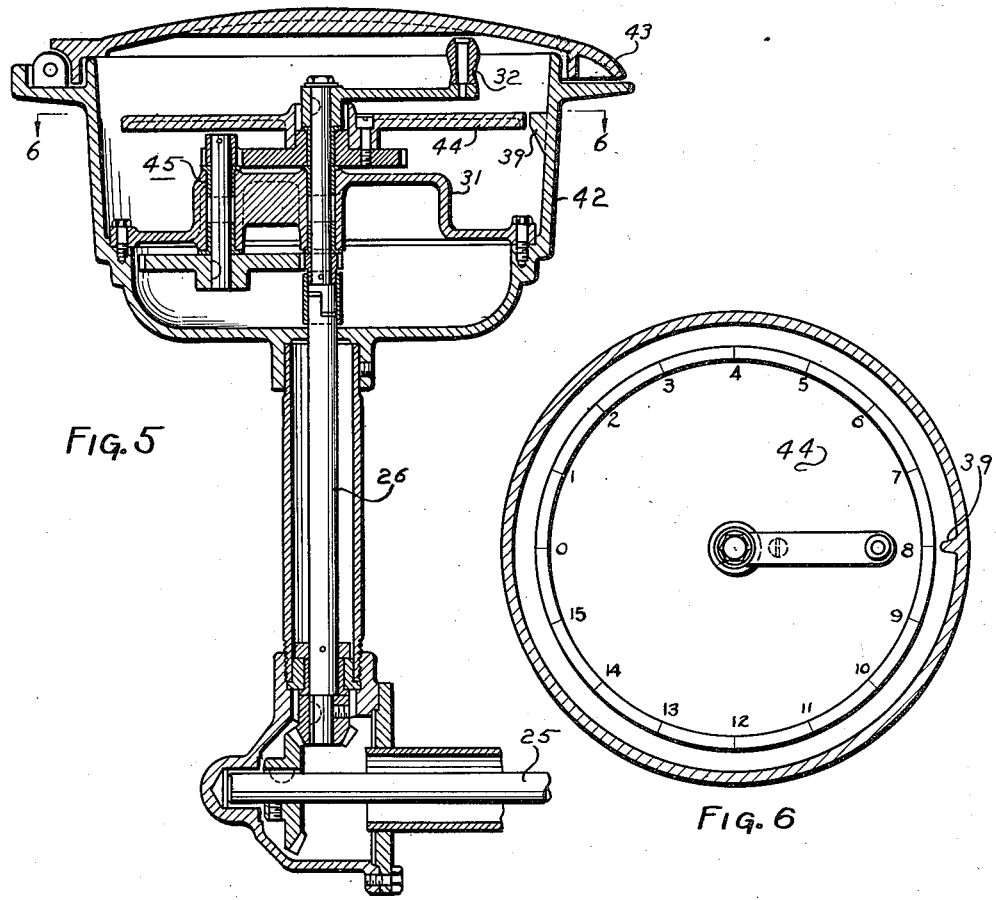
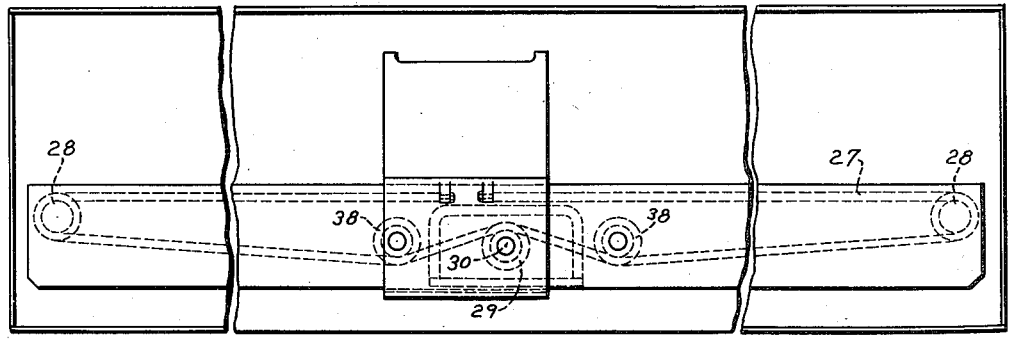
INVENTOR.
JAMES J. PELOUCH
BY
Woodling and Krost
ATTORNEYS Patented Dec. 4, 1951

2,577,376

UNITED STATES PATENT OFFICE

2,577,376

AXLE ENGAGING MEANS FOR VEHICLE HOISTS

James J. Pelouch, Cleveland, Ohio, assignor, by mesne assignments, to Harold C. Schott, Cleveland, Ohio Application December 7, 1948, Serial No. 64,001

5 Claims. (Cl. 254—89)

This invention relates to automobile lifts in general, and relates more particularly to a lift which is retractable into a covered pit below floor level and has an adjustable axle contact member thereon, and it relates specifically to a remotely controlled adjustable axle contact member which may be positioned relative to the axle of a vehicle before the lift emerges from the covered pit.

Prior automobile lifts generally consisted of a single hydraulic post and an H-shaped superstructure. The post operated in a cylinder extending into the floor of the service station or garage and the superstructure rested upon the floor. A vehicle to be lifted was driven upon the superstructure and then both the superstructure and the vehicle were lifted off of the floor by the hydraulic post.

Two-post lifts have been developed in which one post is adapted to contact the front axle of a vehicle, and a second post is adapted to contact the rear axle of the vehicle. Many advantages in automotive servicing and repair work are obtainable by a two-post lift. However, a problem immediately arose with two-post lifts which was not apparent in the one-post lift having a large superstructure upon which the vehicle could be driven, and that problem was to make the lift adaptable to vehicles of widely varying wheel bases. That is, the lift, to be of any practical value, must be able to service substantially any make or model of automobile. Further, the modern lift is designed to raise the vehicle by contacting the axle of the vehicle rather than the wheels. Therefore, the superstructure of the modern lift is substantially more narrow than the old type of superstructure having a wide path upon which the wheel of the vehicle was adapted to rest. Because of the narrow width of the superstructure in the modern lift, and because it is desirable to leave the undercarriage of the vehicle as nearly unobstructed by the lifting superstructure as possible, axle contact members are provided on the superstructure of each post in a two-post lift, and the axle contact members on the rear post are shiftable for contacting the rear axle of a vehicle regardless of its position. Therefore, the vehicle is placed with the front axle thereof over the front post of the lift and the shiftable axle contact members are aligned with the rear axle before the rear post of the lift is raised. Thus, by providing the shiftable contact members on one of the posts of a two-post lift, the two-post lift is readily adaptable for any length wheel base vehicle within a predetermined range.

In order to make the lift more valuable, recent developments have been made to provide pits into which the entire lift including the superstructure could withdraw and be covered. Thus the large amount of floor space normally occupied by an automobile lift is available in the modern garage for other purposes when the lift is not being used. The space thus saved is equivalent to an entire supplemental garage in service stations and service garages having numerous lifts. Prior to the present invention, however, the axle contact members provided with two-post lifts were very difficult to align with the axle of the vehicle. As before stated, the modern two-post lift is retracted into a pit which is covered in order that the floor area may be used for other purposes when the lift is retracted. The axle contact member is thus covered and out of sight within the lift pit. Consequently, prior lift devices require the attendant to start the lift in its upward direction until it extends just above the floor level of the pit. Then the attendant uses a long rod or crawls under the car to move the axle contact members into line with the rear axle of the vehicle.

An object of the invention is to provide an improved axle contact member for a vehicle lift.

Another object of the invention is to provide an axle contact member which may be moved with respect to the lift mechanism to adapt the lift for raising vehicles of various wheel base by their axles.

Still another object of the invention is to provide means for adjustably moving the axle contact members of a vehicle lift while the lift is enclosed within a covered pit.

Yet another object of the invention is to provide remote control adjustment means for adjusting the axle contact members of a vehicle lift covered within a floor pit.

A still further object of the invention is to provide remote control handle means a distance from a vehicle lift which is adapted to be covered within a floor pit, and extension means below floor level extending from the control handle means to the pit, the extension means being adapted to be operated by the control handle to move the concealed axle contact members of the lift relative to a vehicle parked over the lift.

A still further object of this invention is to provide a vehicle lift having two spaced longitudinally extending members with shiftable axle contact members mounted thereon, and to provide a drive means mounted on the lift to shift the axle contact members, and an extendable drive interconnection from a fixed remote control to said drive means on the lift, in order that the axle contact members may constantly be within the operative control of the remote control regardless of the elevation of the lift, including a position of the lift within a closed lift pit.

Another object of this invention is to provide remote control means to position the axle contact members of a vehicle lift when the lift is covered within a closable pit, the remote control means including an indicator dial adapted to indicate the position of the axle contact members on the lift within the closable pit.

Other objects and a fuller understanding of the invention may be had by referring to the following description and claims, taken in conjunction with the accompanying drawings, in which:

Figure 1 is a perspective view of a two-post lift which is retractable within a covered floor pit, the rear post lift being provided with the axle contact members and position-adjusting means of this invention, including a vertical post for extendable drive interconnection between a remote control and the axle contact members for all positions of the lift;

Figure 2 is a cross-sectional view through the rear post lift of Figure 1, illustrating the construction of the extendable drive interconnection for the axle contact members;

Figure 3 is a sectional view along the line 3—3 of Figure 2;

Figure 4 is a side view of one of two longitudinally extending members of the rear lift, illustrating in phantom lines the drive means behind the longitudinally extending members employed to interconnect the shiftable axle contact members with the extendable drive illustrated in Figure 2;

Figure 5 is a cross-sectional view through the remote control handles and extension arm of this embodiment of the invention; and Figure 6 is a top view of the dial of the remote control in the illustrated embodiment of the invention.

The drawings illustrate an embodiment of the invention providing means to adjust the position of axle contact members upon the superstructure of a lift while the lift and axle contact members are covered within a lift pit, and also providing extendable continuous interconnection between a remote control and the axle contact members, whereby the axle contact member may be shifted upon the lift at any position of elevation of the lift out of the lift pit. In other words, the interconnection between the remote control and the shiftable axle contact members is extendable and therefore the shiftable axle contact members may be moved when the lift is covered within the lift pit, but they may also be moved when the lift is raised from the pit. As previously indicated, the modern two-post lift generally is provided with adjustable axle contact members only upon the rear post, although, if desired, four adjustable axle contact devices could be provided. Therefore, without limiting this invention to any particular member of adjustable axle contact devices, the rear post of a two-post lift is illustrated with right and left adjustable axle contact devices.

In the Figure 1 of the drawing the general plan of a two-post lift is illustrated having a front lift 17 of conventional construction adapted to withdraw into a pit 18, and a rear lift 19 adapted to withdraw into a lift pit 13. The principles of this invention, and an actual embodiment of the invention, are illustrated only in connection with the rear lift 19, because substantially all lifts provided for service stations and garages require only that the rear lift 19 has adjustable axle contact means. Both the front pit 18 and the rear pit 13 may be covered by any suitable means when the post and superstructure thereon are withdrawn into the pit. The Figure 1 illustrates the relative position of the position-adjusting means with respect to the axle contact members. The actual details of construction of the illustrated embodiment of the invention are set forth in the remaining figures of the drawing.

The rear lift 19 comprises a hydraulic post 10 of suitable standard design and construction, having a cross member 11 bolted or otherwise suitably fastened on the end of the post. The Figures 1 and 2 best illustrate the position of two spaced longitudinally extended upright members 12 and 112 securely mounted on each end of the cross member 11. The cross member 11, and the members 12 and 112 constitute an H-shaped superstructure mounted on the end of the hydraulic post 10 for elevational movement to contact the undercarriage of a vehicle and lift the vehicle.

Because of the construction of the modern automotive vehicle, and also because it is desired to lift an automobile as free of interference as is possible, axle-engaging blocks are provided upon the members 12 and 112 to contact the axle of the vehicle. Axle-engaging block 14 is shiftably mounted upon the upright member 12, and axle-engaging block 114 is shiftably mounted upon the upright member 112. As illustrated in Figure 2, the axle-engaging blocks 14 and 114 have a C-shaped channel portion adapted to slidably fit upon the upright members 12 and 112 to permit the engaging blocks to be longitudinally adjusted by sliding movement. The block 14 is provided with a notch 40 and a block 114 is provided with a notch 140 on the top edge thereof to receive an axle or frame portion of the vehicle and prevent the vehicle from sliding off of the block members.

As previously indicated, it is an object of this invention to shift the members 14 and 114 with respect to the superstructure of the lift, and therefore drive means is provided for driving the block members 14 and 114 simultaneously to corresponding longitudinal positions on the upright longitudinal members 12 and 112. The drive means is carried by the lift, and comprises, in the preferred embodiment, a drive shaft 30 extending laterally between the upright longitudinal members 12 and 112, and suitably bearinged in the members 12 and 112 by bearings 34 and a similar bearing on member 112. The shaft 30 is provided with a drive sprocket 29 positioned adjacent to the longitudinal upright member 12, and a similar sprocket positioned adjacent to the longitudinal upright member 112, as illustrated in the Figure 2. The sprockets are nonrotatably secured upon the shaft 30, and therefore will be drivingly rotated by the shaft 30. The constuction and operation of the blocks 14 and 114 upon the longitudinal members 12 and 112 is substantially identical, and therefore the details of construction are illustrated only in connection with block 14 and member 12 in order to show the details in larger size.

Referring now to the Figure 4 of the drawings, the side view of the superstructure is illustrated with the drive means for the block 14, which is behind the member 12, shown in dotted outline. Sprockets 28 are positioned at each end of the member 12, and a flexible drive chain 27 is looped around the sprockets 28 and is engaged with drive sprocket 29 and idle sprockets 38. The sprockets 38 hold the chain 27 tight and in engagement with sprocket 29. The upright longitudinal member 112 is provided with similar sprockets and chains not illustrated. The chain 27 is driven by the sprocket 29, and the similar chain adjacent the member 112 will operate at exactly the same linear speed because both the drive sprockets are rotatably driven by the same shaft 30. The chain 27 is secured at one point to the axle-engaging block 14, and the chain driven by the similar sprocket on the shaft 30 near member 112 is secured to the axle-engaging block 114, and therefore movement of the chain 27 and the corresponding chain at the member 112 will cause the axle-engaging blocks 14 and 114 to move longitudinally upon the upright members 12 and 112. The drive shaft 30 may be rotated in either direction to move the axle-engaging blocks 14 and 114 to any selected position upon the upright longitudinal members 12 and 112.

A further object of this invention is to provide an extendable drive interconnection from a fixed remote control to the drive means on the lift in order that the axle-engaging blocks may constantly be within the operative control of the remote control regardless of the elevation of the lift, and regardless of whether the lift is fully extended or completely retracted within a covered pit. In other words, it is an object of this invention to provide control apparatus for moving the axle-engaging blocks 14 and 114 even when the superstructure of the lift is completely closed within a lift pit below floor level. In the Figure 2 of the drawing, a drive gear 35 is secured upon the drive shaft 30, and a meshing gear 36 is carried by the cross member 11. A rotatable vertical shaft 20 is carried by the cross member 11 and is drivingly connected to the gear 36 by means of a universal drive joint 37.

The vertical shaft 20 serves a dual purpose in the illustrated embodiment of the invention, in that it will prevent rotation of the rear lift 19, and also serve as an extendable interconnection to the drive shaft 30. Without an anti-rotation device of some sort, the hydraulic post 10 would be able to rotate about its longitudinal axis. Therefore, it is desirable that anti-rotation means of some sort be provided. The vertical shaft 20 is adapted to extend into a shaft pit 21, and as before stated, the shaft 20 is connected to the cross member 11 of the superstructure by the universal drive joint 37. Therefore, the shaft 20 provides an extendable interconnection between the shaft pit 21 and the superstructure of the lift 19 and prevents rotation of the superstructure upon the hydraulic post 10.

In the preferred mechanical embodiment of this invention, the shaft 20 is also employed as the extendable interconnection between a remote control and the drive shaft 30 to position the axle-engaging blocks 14 and 114. The shaft 20 is made noncircular in cross-sectional configuration, and is preferably made hexagonal. A collar 22 is provided with a hexagonal opening therethrough substantially the same size as the outer periphery of the shaft 20, and therefore the shaft 20 is vertically slidable along the longitudinal axis thereof through the collar 22, but the shaft 20 and collar 22 are non-rotative with respect to one another. That is, if the collar 22 is rotated around the longitudinal axis of the shaft 20, it will drivingly rotate the shaft 20, and consequently will drivingly rotate the drive shaft 30 through the universal joint 37 and the gears 35 and 36.

The collar 22 is securely mounted by any suitable means below the pit 13 and above the top of the shaft pit 21. The collar 22 is provided with a gear portion 23 thereon, and a meshing gear 24 is adapted to transmit driving force to the collar 22. The collar 22 and the gear 24 are stationarily mounted, as before indicated, below the floor level, and the shaft 20 is free to move through the collar 22 along with the superstructure of the lift 19 when the hydraulic post is actuated to lift the superstructure out of the pit 13.

A remote control or power means is provided to drive the collar 22 from a position laterally removed from the pit 13 in order that the operator may adjust the position of the axle-engaging blocks 14 and 114 within the closed pit 13 while a vehicle is parked over the pit 13.

The remote control power means includes a laterally extending shaft 25 extending below the floor level to the gear 24, and also includes a power source to drivingly rotate the shaft 25. In the illustrated embodiment of the invention as set forth in Figure 5 of the drawings, the power source is manual and includes a handle 32 adapted to drive a vertical shaft 26 from a transmission assembly 31 to the shaft 25 which serves as an extension arm to the gear 24. It is to be understood, of course, that any suitable power means may be employed to drive the gear 24, and the illustrated embodiment is set forth to illustrate the manual type of operation. The handle 32 is adapted to drive the shaft 26 as illustrated in the Figure 4, and the shaft 26 is in turn geared to the extension arm shaft 25.

The transmission of force from the handle 32 to the shaft 25 may be direct, or may be suitably gear connected to provide a mechanical advantage if desired.

Although a mechanical drive is illustrated and described, it is to be understood that any power means may be employed to drive the shaft 30 directly, or by driving the shaft 20, and remotely operable control means provided according to the type of power means.

It has been stated that a further object of this invention is to provide means to indicate the position of the axle-engaging block members 14 and 114 although these members are hidden within a covered lift pit. This indication is provided by a longitudinal scale member 41 extending along the side of the pit 13 substantially parallel to the upright longitudinal member 12. The scale 41 is best illustrated in the Figure 1 of the drawing. Any suitable marking scale may be imprinted upon the surface of the scale 41, either actually marking the distance along the pit 13, or being an arbitrary scale. The Figure 5 of the drawing illustrates a recessed housing 42 to enclose the transmission assembly 31, and a cover lid 43 to cover the housing 42. A circular scale 44 is mounted within the housing 42 around the shaft 26 and below the handle 32. The circular scale 44 is marked around the circumference with markings to correspond to the markings upon the longitudinal scale 41. A pointer 39 is mounted on the side of the housing and provides a convenient reference point to indicate the rotational position of the circular scale 44. The scale 44 does not rotate directly with the shaft 26, but is revolved at a reduced rate by means of the transmission assembly 31 including a suitable reduction gear train 45 as illustrated in the Figure 5. The handle 32 must be rotated a plurality of revolutions in order to move the axle-engaging blocks 14 and 114 the full length of the longitudinal upright members 12 and 112, but it is desirable to have the markings upon the circular scale 44 less than 360 degrees around the circumference of the scale 44. Therefore, the reduction train 45 will rotate the circular scale 44 in a definite fixed relationship with the rotation of the shaft 26 and the position of the axle-engaging blocks 14 and 114, but at a reduced rate.

Therefore, by properly coordinating the markings upon the circular scale 44 with the markings upon the longitudinal scale 41, the operator can rotate the handle 32 to move the axle-engaging blocks 14 and 114, until the marking upon the circular scale 44 indicates that the axle-engaging blocks 14 and 114 have been moved to the desired corresponding marking upon the longitudinal scale 41. The hydraulic post 10 may then be actuated to move the superstructure out of the pit 13, and the blocks 14 and 114 will engage the axle of a vehicle parked over the pit 13.

Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

I claim:

1. A vehicle lift having a post and superstructure, a lift pit below floor level, said post having a superstructure including two spaced longitudinally extending members, an axle-engaging member mounted on each said longitudinally extending member for longitudinal reciprocable adjustment of position with respect thereto, a drive shaft extending transversely of said spaced longitudinally extending members, driving interconnection means between each axle-engaging member and said drive shaft, rotation of the drive shaft thereby being adapted to longitudinally move the axle-engaging member simultaneously upon their respective longitudinally extending support members to a corresponding position, a vertical post carried by said superstructure, gear means to drivingly interconnect said post and said drive shaft, a drive collar stationarily mounted below said floor level in said lift pit, said drive collar having an opening therethrough complementary to the cross-sectional configuration of said shaft, said collar carried nonrotatively and relatively longitudinally reciprocable on said post, said shaft thereby being vertically slidable and nonrotatable with respect to said drive collar to permit the shaft to move vertically and remain in nonrotative contact with said collar, and remote power means having a drive extension below said floor surface to said drive collar adapted to drivingly rotate said drive collar, said power means thereby being adapted to drive the vertical shaft and the drive shaft from a remote position to move the axle contact member to a selected position with the lift extended or retracted to any selected height.

2. A vehicle lift having a lift post, a cross member carried by said post, two spaced longitudinally extending members carried by said cross member, an axle-engaging member mounted on each said longitudinally extending member for longitudinal reciprocable adjustment of position with respect thereto, drive means carried by said lift for driving said axle-engaging members simultaneously to corresponding longitudinal positions on said longitudinally extending members, a rotatable vertical shaft means carried by said lift adapted to operate said drive means, a drive collar stationarily mounted with respect to said lift, said drive collar having an opening therethrough complementary to the cross-sectional configuration of said shaft, said collar carried nonrotatively and relatively longitudinally reciprocable on said shaft, said shaft thereby being vertically slidable and nonrotatable with respect to said drive collar to permit the shaft to move vertically and remain in nonrotative contact with said collar, and remote power means having a drive extension adapted to drivingly rotate said drive collar, said power means thereby being adapted to drive the vertical shaft and the drive means from a remote position to move the axle contact members to a selected position with the lift extended or retracted to any selected height.

3. A vehicle lift having a superstructure including longitudinally shiftable axle contact members, drive means to shift said axle contact members with respect to said superstructure, a vertically stationary shift control station located a distance from said lift, said shift control station having means to indicate the position of a vehicle axle parked over said lift, a power receiving station carried by said lift, said power receiving station being in local control on said lift of the movement of said drive means, and control transmission means linking said shift control station to said power receiving station at all elevational positions of said lift, said shiftable axle contact members thereby being shiftable to a predetermined position on said superstructure without observation.

4. A vehicle structure comprising, a lift pit having closable cover means at floor level, a vehicle lift having a superstructure, means to lower said lift into said pit and close said cover means over said pit, said superstructure having longitudinally shiftable axle contact members mounted thereon, drive means carried by said lift to shift said axle contact means with respect to said superstructure, a drive crank fixedly mounted a distance from said pit, said shift control station having means to indicate the position of a vehicle axle parked over said lift, power transmission means extending below floor level from said drive crank into said pit, and extendable power transfer means interconnecting said power transmission means and said drive means at all elevational positions of said superstructure, whereby said axle contact members may be moved on said superstructure by rotating said drive crank.

5. In a vehicle lift having a superstructure including longitudinal rail means, the provision of adjustable axle contact means for said lift comprising, an axle contact member mounted for longitudinal adjustment along said rail means, drive means to shift said axle contact means with respect to said longitudinal rail means, a vertically stationary shift control station located a distance from said lift, and an extendable power train linking said shift control station to said drive means at all elevational positions of said superstructure.

JAMES J. PELOUCH.

REFERENCES CITED

The following references are of record in the file of this patent:

UNITED STATES PATENTS

| Number | Name | Date |
|---|---|---|
| 1,849,777 | Weaver | Mar. 15, 1932 |
| 1,889,185 | Stukenborg | Nov. 29, 1932 |
| 2,015,357 | Weaver | Sept. 24, 1935 |
| 2,091,067 | Engh | Aug. 24, 1937 |
| 2,120,051 | Tully | June 7, 1938 |
| 2,423,954 | Thompson | July 15, 1947 |
| 2,424,673 | Thompson | July 29, 1947 |